Nov. 29, 1960     G. O. ROCKWELL     2,962,697

DIRECTIONAL LOCATOR FOR ORIGIN OF FLUID BORNE VIBRATIONS

Original Filed April 3, 1946     3 Sheets-Sheet 1

Inventor
GAYNOR O. ROCKWELL

By M. O. Hayes

Attorney

Nov. 29, 1960  G. O. ROCKWELL  2,962,697
DIRECTIONAL LOCATOR FOR ORIGIN OF FLUID BORNE VIBRATIONS
Original Filed April 3, 1946  3 Sheets-Sheet 2

Inventor
GAYNOR O. ROCKWELL
M. A. Hayes
By
Attorney

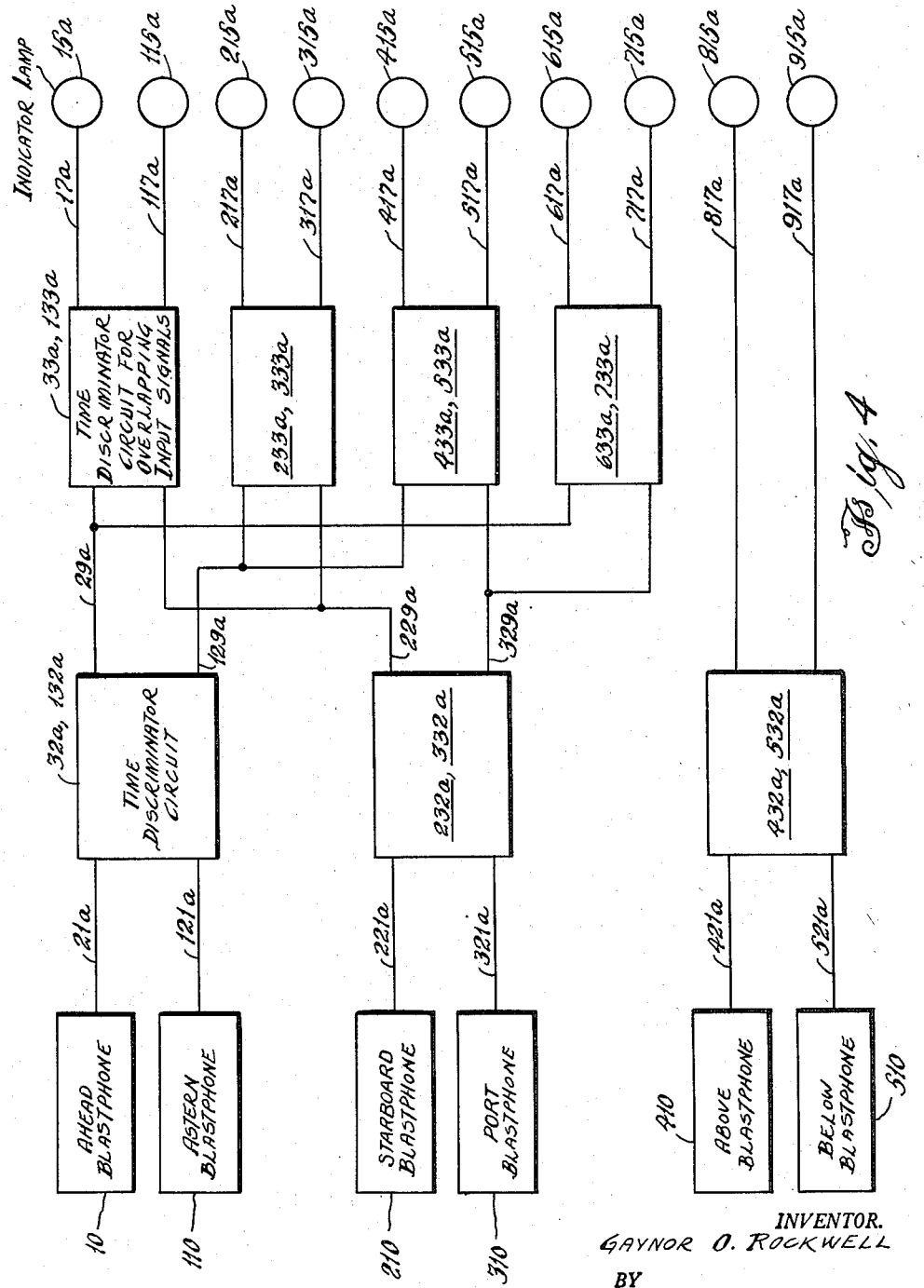

2,962,697
Patented Nov. 29, 1960

2,962,697

DIRECTIONAL LOCATOR FOR ORIGIN OF FLUID BORNE VIBRATIONS

Gaynor O. Rockwell, Houston, Tex., assignor to the United States of America as represented by the Secretary of the Navy Original application Apr. 3, 1946, Ser. No. 659,191. Divided and this application Mar. 4, 1958, Ser. No. 720,521

2 Claims. (Cl. 340—16)

This application is a division of application Serial Number 659,191, filed April 3, 1946, by Gaynor O. Rockwell for Depth Charge Attack Recorder.

This invention relates to a recorder as used in submarines for indicating the pattern of the externally exploded depth charges.

In submarine warfare, it is of great help to the submerged submarine under attack if the pattern of the exploding depth charges can be determined in order that the best evasive tactics can be followed.

In my co-pending application, Serial No. 561,453, which matured into Patent No. 2,703,873 on March 8, 1955, indicators are located for the corresponding external positions about a submarine above, below, fore and aft, port and starboard. In order to utilize the best evasive tactics, it is necessary to distinguish in horizontal directions between an explosion occurring nearly on the submarine course and one occurring in the same quadrant, but nearly abeam, particularly as an explosion within a few points dead ahead represents a greater potential peril to the submarine than those occurring more nearly to the beam.

It is an object of this invention to improve both the quality and quantity of the information recorded within the submarine.

A further object is to provide a locator for determining at a station in a fluid medium the approximate radial direction relative to an axis through the station, from which fluid-borne mechanical vibrations arrive at the station.

Other objects and many of the attendant advantages of this invention will be readily appreciated as the same becomes better understood by reference to the following detailed description when considered in connection with the accompanying drawings wherein:

An embodiment of the improvements of this invention are shown in the following drawings, in which:

Fig. 4 is a block diagram of the equipment shown in Figs. 1–3.

Figure 1:
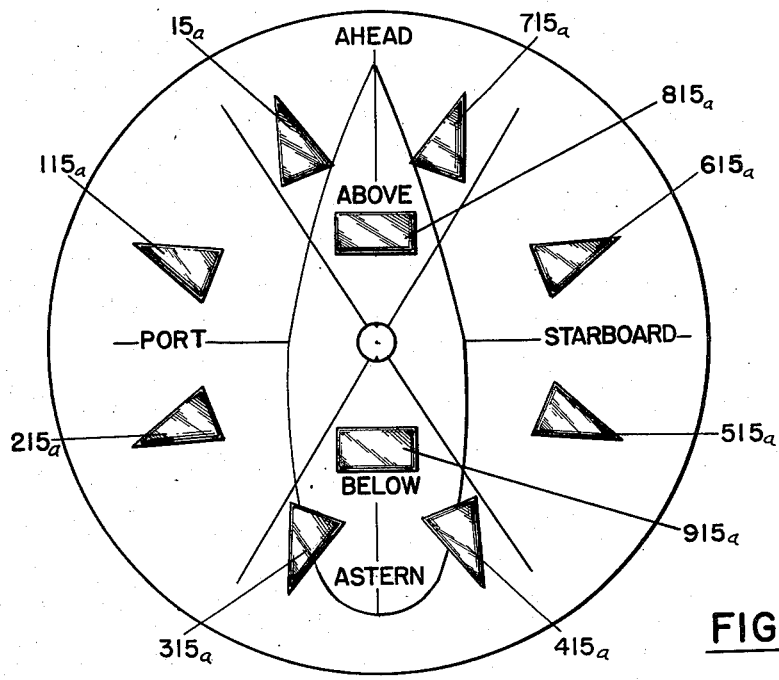
Fig. 1 shows an improved arrangement of blastphone location indicators on a panel for indicating more accurately the directions of explosions.
Figure 2:
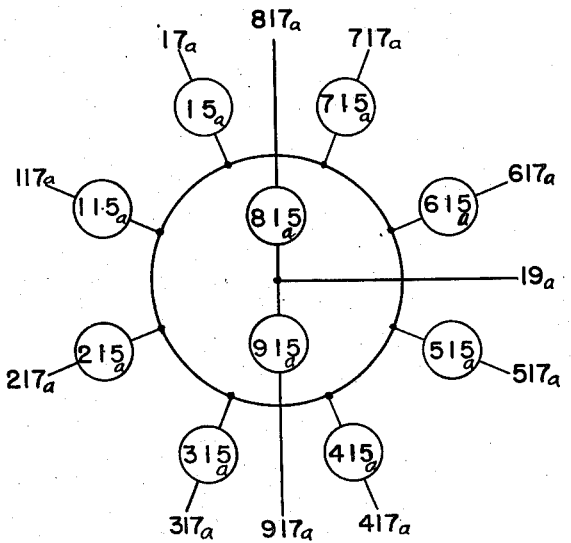
Fig. 2 is the lamp lay-out for the panel of Fig. 1.

In the embodiment shown in the drawings, lamps 15a, 115a, 215a, 315a, 415a, 515a, 615a and 715a indicate horizontal direction, while lamps 815a and 915a give "above" and "below" indications respectively. They are supplied through leads 17a, 117a, 217a, 317a, 417a, 517a, 617a, 717a, 817a and 917a from the discriminator circuits and have a common negative lead 19a. The horizontal indications represented by the lamps are a follows: 15a, "on the port bow"; 115a, "forward of the port beam"; 215a, "abaft the port beam"; 315a, "on the port quarter"; 415a, "on the starboard quarter"; 515a, "abaft the starboard beam"; 615a, "forward of the starboard beam"; and 715a, "on the starboard bow." For ease of observation and interpretation they are arranged in a circle as shown and appear through a dial on which a ship's outline is presented.

Figure 3:
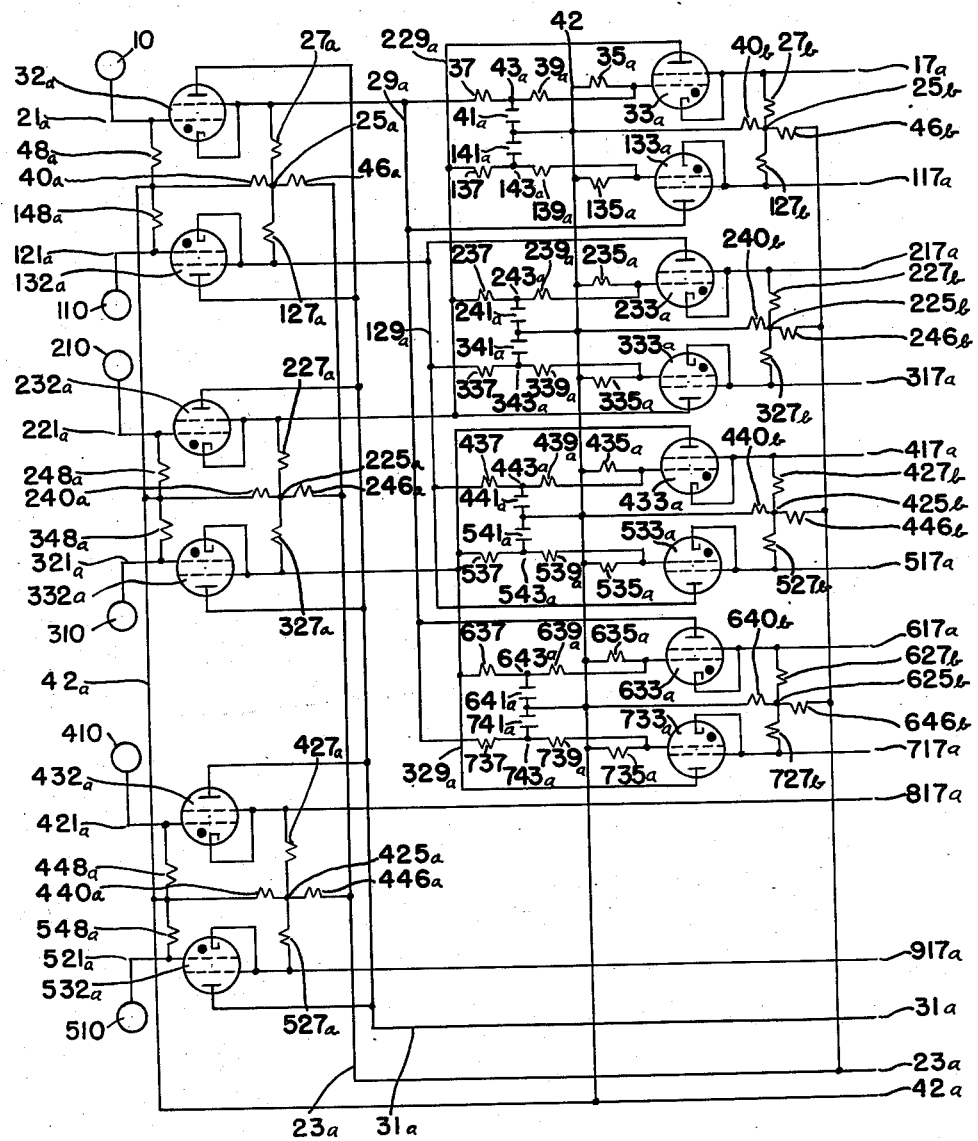
Fig. 3 is a circuit diagram of the equipment shown in Figs. 1 and 2.

Referring to Figs. 3 and 4 signals from the blastphones reach the grids of thyratrons 32a, 132a, 232a, 332a, 432a and 532a of the first discriminator through leads 21a, 121a, 221a, 321a, 421a and 521a. The grids are connected to negative lead 42a through resistors 48a, 148a, 248a, 348a, 448a and 548a, and are maintained at the proper negative bias voltage with respect to the cathodes by the action of three voltage dividers made up of resistors 40a and 46a, 240a and 246a, and 440a and 446a, respectively, between the negative lead 42a and a positive lead 23a, the cathodes being connected to the common terminals 25a, 225a and 425a of these pairs of resistors by resistors 27a, 127a, 227a and 327a and 427a and 527a. The cathodes of thyratrons 32a, 132a, 232a and 332a are also connected to input busses 29a, 129a, 229a and 329a, respectively; while the cathodes of thyratrons 432a and 532a are connected, respectively, to the indicator leads 817a and 917a. The plates of the thyratrons 32a, 132a, 232a, 332a, 432a and 532a are supplied from a plate lead 31a.

The cathodes of thyratrons 33a, 133a, 233a, 333a, 433a, 533a, 633a and 733a of the second discriminator are connected, similarly to those of the first discriminator, to taps 25b, 225b, 425b and 625b of voltage dividers made up of resistors 40b and 46b, 240b and 246b, 440b and 446b, and 640b and 646b through resistors 27B and 127b, 227b and 327b, 427b and 527b, and 627b and 727b, and are also connected to indicator leads 17a, 117a, 217a, 317a, 417a, 517a, 617a and 717a, respectively. The grids are connected to the negative lead 42a through resistors 35a, 135a, 235a, 335a, 435a, 535a, 635a and 735a, respectively, and also to the input busses as hereinafter described.

From input bus 29a connections go directly to the plates of thyratrons 133a and 633a. Connection is also made to the grid of thyratron 33a through a coupling circuit composed of series resistors 37 and 39a and a condenser 41a connected between the common terminal 43a of the resistors 37 and 39a and the negative lead 42a. A similar connection is made to the grid of thyratron 733a.

In like manner connections are made from bus 129a to the plates of thyratrons 233a and 533a, and to the grids of thyratrons 333a and 433a; from bus 229a to the plates of thyratrons 33a and 333a, and to the grids of thyratrons 133a and 233a; and from bus 329a to the plates of thyratrons 433a and 733a, and to the grids of thyratrons 533a and 633a.

In the operation of the disclosed embodiment, the pressure wave front moving outward from a depth charge explosion strikes one of each pair of blastphones before it strikes the others. The electrical impulses from the first blastphones struck are conducted to the grids of their associated thyratrons in the first time-discriminator circuit. What then occurs can best be described by considering one pair of blastphones, for example, those controlling the "ahead" and "astern" indications through the thyratrons 32a and 132a.

Assume that the pressure wave front first strikes the "ahead" blastphone. A signal from this blastphone is impressed on the grid of thyratron 32a through the connection 21a and changes the voltage on its grid to overcome the negative grid-bias voltage of about 7.5 volts with respect to the cathode produced across the voltage divider resistor 40a. Neutralization of the grid-bias voltage permits the thyratron 32a to become conductive. While the thyratron was inactive the voltage between its plate and cathode was the difference between the line voltage, nominally 120 volts, and the grid-bias voltage, about 7.5 volts, or about 112.5 volts. When the thyratron becomes conductive, the voltage drop between plate and cathode decreases to about 14 volts. Since the plate remains at line voltage, the potential of the cathode is raised to about 106 volts. By reason of the action of the resistors 40a and 46a of the voltage divider and resistor 27a between the cathode and midterminal 25a of the voltage divider, the voltage of the terminal 25a and hence of the cathode of the thyratron 132a, connected with it through the resistor 127a, is raised from 7.5 volts to about 45 volts above that of the negative lead 42a and the grid of this thyratron. This voltage difference between grid and cathode, instantaneously produced, provides a negative grid bias far too great to be overcome by any signal impulse received from the "astern" blastphone and thus prevents the thyratron from being made conductive. Similarly, the first of each of the other pairs of thyratrons 232a and 332a, and 432a and 532a to become conductive "locks out" the other so that only three of the six cathode-output leads are energized as a result of any one explosion.

The voltage increase on the cathode of two of the thyratrons 32a, 132a, 232a and 332a will energize two of the input busses 29a, 129a, 229a and 329a, while that on the cathode of one of the thyratrons 432a and 532a will be applied through one of the indicator leads 817a and 917a directly to the corresponding one of the two indicator lamps 815a and 915a, lighting it.

The second time-discriminator circuit operates to utilize the difference in the time of arrival of the pressure wave front at the first of the fore-and-aft blastphones and at the first of the athwartship blastphones. An explosion occurring nearly abeam will energize an athwartship blastphone first, while one occurring nearly on the line of the submarine's axis will energize a fore-and-aft blastphone first. The bearing of the line of division between these two situations depends on the geometry of the location of the blastphones, being perpendicular to a line joining a blastphone of one pair to one of the other pair.

Assume that an explosion occurs nearly ahead of the submarine and to port. The advancing pressure wave front strikes the "ahead" blastphone first, then the "port." As a result the input bus 29a is energized before bus 229a.

When bus 29a is energized, the plates of thyratrons 133a and 633a are immediately raised to the voltage of the cathode of thyratron 32a, about 106 volts, and at the same time current starts to flow through the resistors 37 and 737 to charge the condensers 41a and 741a, raising the voltage of terminals 43a and 743a, and, through the action of resistors 39a and 35a, and 739a and 735a, the voltage of the grids of thyratrons 33a and 733a to a voltage which overcomes the biasing effect of the voltage dividers composed of resistors 40b and 46b, 640b and 646b.

Similarly, when the bus 229a is energized the plates of thyratrons 33a and 333a are immediately brought to operating voltage and the grids of thyratrons 133a and 233a are, after a delay, brought to a voltage neutralizing their bias voltages.

Neglecting further action in the circuit, the final result is to apply grid and plate operating voltages to thyratrons 33a and 133a, plate operating voltages only to thyratrons 333a and 633a, and grid operating voltage only to thyratrons 233a and 733a. However, no matter how short the time interval may be between the energizing of bus 29a and of bus 229a, the grid of thyratron 33a will have operating voltage applied to it first, the thyratron will be made conductive and will raise the cathode voltage of thyratron 133a to the "lock-out" value before the latter can become conductive in the same manner as hereinbefore described in considering the action of thyratron 32a relative to thyratron 132a. Thus, voltage, in this instance, can be applied only from the cathode of thyratron 33a to the indicating lamp 15a, lighting it. If the sequence of arrival of the pressure wave front at the two blastphones is reversed, the action of the second discriminator is also reversed and lamp 115a is lighted. Similarly, any other horizontal direction is indicated by the illumination of a suitable lamp.

Obviously many modifications and variations of the present invention are possible in the light of the above teachings. It is therefore to be understood that within the scope of the appended claims the invention may be practiced otherwise than as specifically described.

What is claimed is:

1. A locator for determining at a station in a fluid medium the approximate radial direction relative to an axis through the station, from which fluid-borne mechanical vibrations arrive at such station which comprises a plurality of pairs of transducers for intercepting said vibrations and each transducer being of the type capable of converting said vibrations intercepted thereby into electrical signals, means supporting said transducers immovably with respect to one another and in spaced apart and approximately coplanar relationship, whereby imaginary straight lines may be extended between said transducers in a particular succession to provide an imaginary polygon whose number of sides is equal to the number of transducers and with each transducer at one corner of the polygon and whereby in proceeding continuously along the sides of the polygon, the transducers of each pair are half the number of polygon sides apart, a time-sequence discriminator device for each pair of transducers for receiving electrical signals therefrom for providing an electrical output corresponding to that transducer of its associated transducer pair which is closer to the immediate origin of intercepted fluid-borne mechanical vibrations, said time-sequence discriminator devices providing their electrical outputs in a sequence corresponding to the sequence of electrical signals received thereby from the respective transducer pairs, two indicators for each transducer, each of said indicators corresponding to two particular sequential transducers around said polygon and to a particular sequential order of the two transducers, said indicators being operable for indicating a corresponding number of approximate directions relative to said transducers, and means responsive to said electrical outputs from said discriminator devices and to their sequence for activating only that one of said indicators which corresponds to the transducer closest to the immediate origin of the fluid-borne vibrations and the sequential transducer about said polygon which is the second closest to the immediate origin of the fluid-borne vibrations, to indicate the approximate direction from which the fluid-borne mechanical vibrations arrived at the transducers.

2. A locator for determining at a station in a fluid medium the approximate radial direction relative to an axis through the station, from which fluid-borne mechanical vibrations arrive at such station which comprises; two pairs of transducers for intercepting said vibrations and each transducer being of the type capable of converting said vibrations intercepted thereby into electric signals, means supporting said transducers immovably with respect to one another and in spaced apart and approximately coplanar relationship, whereby imaginary straight lines may be extended between said transducers in a particular succession to provide an imaginary quadrilateral with each transducer at one corner of the quadrilateral and the transducers of each pair disposed at opposite corners of the quadrilateral and whereby straight imaginary lines extended through each of the two transducer pairs are approximately perpendicular, a time-sequence discriminator device for each pair of transducers for receiving electrical signals therefrom for providing an electrical output corresponding to that transducer of its associated transducer pair which is closer to the immediate origin of intercepted fluid-borne mechanical vibrations, said time-sequence discriminator devices providing their electrical outputs in a sequence corresponding to the sequence of electrical signals received thereby from the respective transducer pairs, two indicators for each transducer, each of said indicators corresponding to two of the transducers, one of each pair, and in a predetermined one of the two possible sequences of the two transducers, whereby the eight indicators are for indicating eight different approximate directions relative to said transducers, and means responsive to said electrical outputs from said discriminator devices and to the sequence of outputs for activating only that one of said indicators which corresponds to the transducer closest to the immediate origin of the fluid-borne vibrations and the transducer which is second closest to the immediate origin of the fluid-borne vibrations to indicate the approximate direction from which tions to indicate the approximate direction from which the fluid-borne mechanical vibrations arrived at the transducers.

References Cited in the file of this patent

UNITED STATES PATENTS

| | | |
|---|---|---|
| 2,007,211 | Nicolson | July 9, 1935 |
| 2,398,411 | Cook | Apr. 16, 1946 |
| 2,427,569 | Nicolson | Sept. 16, 1947 |
| 2,499,605 | Nicolson | Mar. 7, 1950 |